United States Patent
Kim et al.

(10) Patent No.: US 10,187,434 B2
(45) Date of Patent: Jan. 22, 2019

(54) METHOD AND APPARATUS FOR CONTROLLING DATA TRANSMISSION IN VOICE CALL OVER PACKET-SWITCHED NETWORK

(71) Applicant: Samsung Electronics Co., Ltd., Gyeonggi-do (KR)

(72) Inventors: Hye Jeong Kim, Gyeonggi-do (KR); Hong Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 148 days.

(21) Appl. No.: 15/257,390

(22) Filed: Sep. 6, 2016

(65) Prior Publication Data
US 2017/0070909 A1    Mar. 9, 2017

(30) Foreign Application Priority Data
Sep. 3, 2015    (KR) ......................... 10-2015-0125156

(51) Int. Cl.
*H04W 52/02*    (2009.01)
*H04L 29/06*    (2006.01)
(Continued)

(52) U.S. Cl.
CPC ..... *H04L 65/4023* (2013.01); *H04W 52/0222* (2013.01); *H04W 76/28* (2018.02); *H04W 28/0236* (2013.01); *H04W 72/1263* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01);
(Continued)

(58) Field of Classification Search
CPC ........... H04W 28/0278; H04W 76/048; H04W 72/04; H04W 52/0222; H04W 72/1273; H04W 76/28; H04W 72/1263; H04W 28/0236; H04L 65/4023; Y02D 70/1262; Y02D 70/164; Y02D 70/24; Y02D 70/166; Y02D 70/1242; Y02D 70/142; Y02D 70/144
See application file for complete search history.

(56) References Cited

U.S. PATENT DOCUMENTS 9,107,159 B2    8/2015    Verger et al.
9,408,144 B2    8/2016    Tabet et al.
(Continued)

*Primary Examiner* — Ayaz R Sheikh
*Assistant Examiner* — Hai-Chang Hsiung
(74) *Attorney, Agent, or Firm* — The Farrell Law Firm, P.C.

(57) ABSTRACT

An electronic device for providing a packet-based voice call function is provided. The electronic device includes a transmit antenna; a receive antenna; and a communication circuit configured to establish an uplink channel using the transmit antenna, establish a downlink channel using the receive antenna, perform a packet-based voice call using the uplink channel and the downlink channel, obtain information associated with the downlink channel, determine a download schedule based on the obtained information associated with the downlink channel, determine a time required from a transmission request to a base station to a grant time, and transmit a voice packet over the uplink channel based on the download schedule and the time required from the transmission request to the base station to a grant time.

17 Claims, 14 Drawing Sheets

(51) Int. Cl.
   *H04W 76/28*   (2018.01)
   *H04W 72/12*   (2009.01)
   *H04W 28/02*   (2009.01)

(52) U.S. Cl.
   CPC .......... *Y02D 70/164* (2018.01); *Y02D 70/166* (2018.01); *Y02D 70/168* (2018.01); *Y02D 70/23* (2018.01); *Y02D 70/24* (2018.01); *Y02D 70/26* (2018.01)

(56) References Cited

U.S. PATENT DOCUMENTS

| | | |
|---|---|---|
| 2014/0140247 A1 | 5/2014 | Venkata |
| 2014/0198699 A1 | 7/2014 | Makharia et al. |
| 2014/0269475 A1* | 9/2014 | Ehsan ............... H04W 52/0235 370/311 |
| 2014/0362830 A1 | 12/2014 | Verger et al. |
| 2015/0009874 A1* | 1/2015 | Edara ................ H04W 52/0225 370/311 |
| 2015/0063261 A1 | 3/2015 | Kim |
| 2015/0124671 A1 | 5/2015 | Tabet et al. |
| 2015/0351060 A1 | 12/2015 | Verger et al. |
| 2016/0286599 A1* | 9/2016 | Weingertner ......... H04M 7/006 |
| 2016/0295579 A1* | 10/2016 | Pham ................... H04W 28/24 |
| 2016/0330011 A1* | 11/2016 | Lee ....................... H04L 5/0066 |

\* cited by examiner

METHOD AND APPARATUS FOR CONTROLLING DATA TRANSMISSION IN VOICE CALL OVER PACKET-SWITCHED NETWORK

PRIORITY

This application claims priority under 35 U.S.C. § 119(a) to a Korean Patent Application filed on Sep. 3, 2015 in the Korean Intellectual Property Office and assigned Serial number 10-2015-0125156, the entire content of which is incorporated herein by reference.

BACKGROUND

1. Field of the Disclosure

The present disclosure relates generally to a method and apparatus for controlling a data transmission time point to reduce power consumed in a voice call, and more particularly to a method and apparatus for controlling a data transmission point to reduce power consumed in a voice over long term evolution (VoLTE) call.

2. Description of the Related Art

In the $3^{rd}$ generation partnership project (3GPP) standard, schemes such as connected disconnection reception (CDRX) and semi-persistent scheduling (SPS) are defined to reduce power consumption in VoLTE. For example, in the case of CDRX, if a base station provides information (e.g., scheduling information) about a period where a terminal does not monitor a downlink channel to the terminal, the terminal may save power during the corresponding period. In addition, in the case of SPS, if a base station semi-persistently sets resources for data transmission and allocates the set resources to a terminal, processes that include the terminal requesting the base station to transmit radio resources may be minimized, thus reducing power consumed by the terminal.

A terminal may achieve optimum power saving when it does not perform both data reception over a downlink and data transmission over an uplink. However, in general, if receiving data over a downlink, the terminal should transmit acknowledge (ACK) information or not acknowledged (NACK) information to the data reception over an uplink. In addition, if transmitting data over an uplink, a terminal should receive ACK/NACK information from a base station. Therefore, although a terminal performs only one of uploading data and downloading data, most modules or functions associated with both downlink and uplink are operated.

If a terminal which performs VoLTE does not achieve synchronization between data transmission and data reception over an uplink and a downlink, although CDRX or SPS is applied, it may be difficult to efficiently save power.

SUMMARY

An aspect of the present disclosure is to provide a method for securing a maximum idle period per one period and reducing power consumed by a VoLTE user equipment (UE) by providing a method for adjusting operation synchronization, or sync, between an uplink and a downlink and additional application examples.

In accordance with an aspect of the present disclosure, an electronic device for providing a packet-based voice call function is provided. The electronic device includes a transmit antenna; a receive antenna; and a communication circuit configured to establish an uplink channel using the transmit antenna, establish a downlink channel using the receive antenna, perform a packet-based voice call using the uplink channel and the downlink channel, obtain information associated with the downlink channel, determine a download schedule based on the obtained information associated with the downlink channel, determine a time required from a transmission request to a base station to a grant time, and transmit a voice packet over the uplink channel based on the download schedule and the time required from the transmission request to the base station to a grant time.

In accordance with another aspect of the present disclosure, a method of providing a packet-based voice call function in a UE is provided. The method includes obtaining information associated with a downlink channel from a base station; determining a download schedule based on the obtained information associated with the downlink channel; determining a time required from a transmission request time to the base station to a grant time; and transmitting voice data over an uplink channel based on the download schedule and the time required from the transmission request time to the base station to the grant time.

In accordance with another aspect of the present disclosure, a non-transitory computer-readable recording medium having instructions stored thereon is provided. The instructions, when executed by an electronic device, cause the electronic device to obtain information associated with a downlink channel from a base station; determine a download schedule based on the obtained information associated with the downlink channel; determine a time required from a transmission request time to the base station to a grant time; and transmit voice data over an uplink channel, based on the download schedule and the time required from the transmission request time to the base station to the grant time.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF PREFERRED EMBODIMENTS OF THE PRESENT DISCLOSURE

Figure 1:
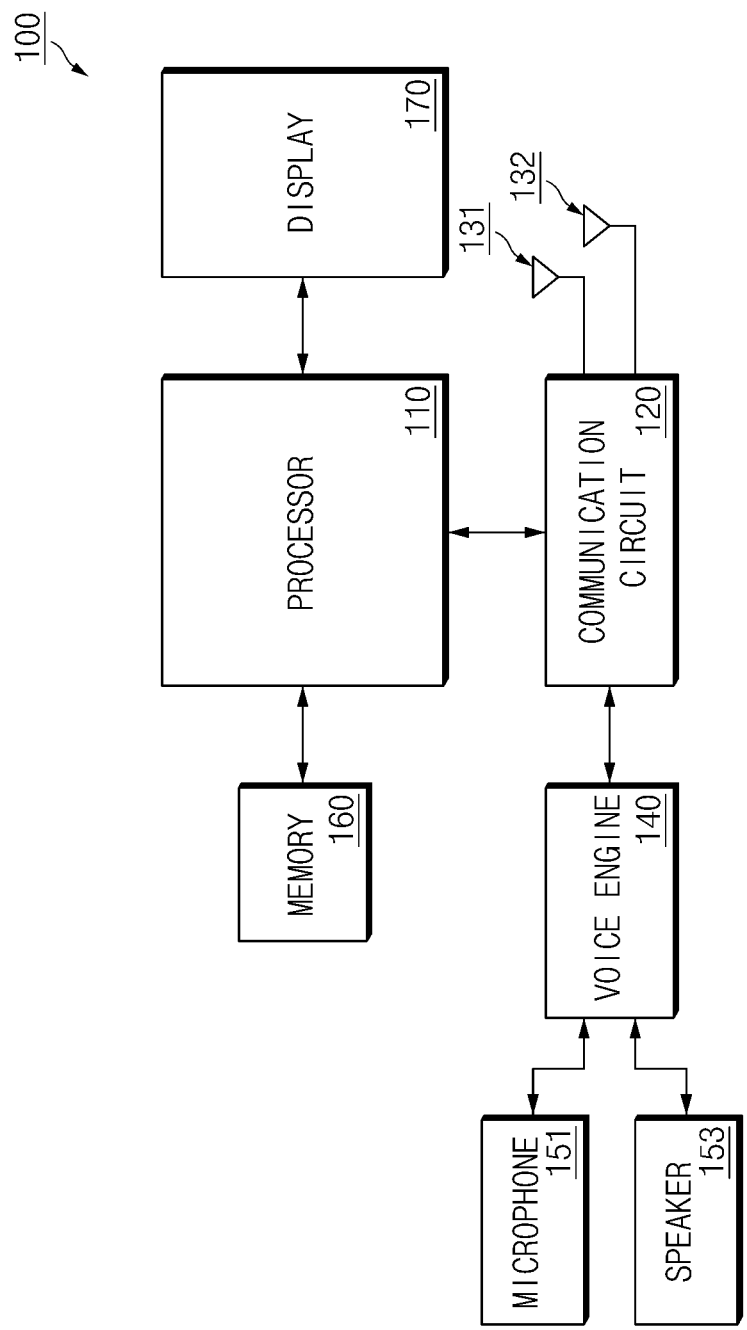
FIG. 1 is a block diagram of a UE, according to an embodiment of the present disclosure.

Hereinafter, various embodiments of the present disclosure are described below with reference to the accompanying drawings. However, the present disclosure is not intended to be limited by the various embodiments of the present disclosure, and it is intended that the present disclosure covers all modifications, equivalents, and/or alternatives of the present disclosure provided they come within the scope of the appended claims as defined by the appended claims and their equivalents. With respect to the descriptions of the accompanying drawings, like reference numerals refer to the same or similar elements, features, and structures.

The terms "include," "comprise," "have," "may include," "may comprise," and "may have" used herein indicate disclosed functions, operations, or the existence of elements, but do not exclude other functions, operations, or elements.

For example, the expressions "A or B" and "at least one of A and/or B" may indicate A, B, or A and B. For instance, the expressions "A or B" and "at least one of A and/or B" may indicate (1) at least one A, (2) at least one B, or (3) both at least one A and at least one B.

The terms "1st," "2nd," "first," "second," and the like used herein may refer to modifying various different elements of various embodiments of the present disclosure, but are not intended to limit the present disclosure. For instance, "a first user device" and "a second user device" may indicate different user devices regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" by another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used in the present disclosure are used to describe certain embodiments of the present disclosure, but are not intended to limit the scope of the present disclosure. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present disclosure are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical device, a camera, or a wearable device. A wearable device may include at least one of an accessory-type device (e.g., a watch, a ring, a bracelet, an anklet, a necklace, glasses, a contact lens, a head-mounted device (HMD)), a textile or clothing-integrated-type device (e.g., electronic apparel), a body-attached-type device (e.g., a skin pad or a tattoo), or a bio-implantable-type device (e.g., an implantable circuit).

An electronic device according to an embodiment of the present disclosure is not limited to the above-mentioned devices, and may include new electronic devices that are developed.

Hereinafter, an electronic device according to various embodiments of the present disclosure are described with reference to the accompanying drawings. In the present disclosure, the term "user" may refer to a person who uses an electronic device or may refer to a device (e.g., an electronic device that employs artificial intelligence) that uses an electronic device. In addition, in the present disclosure, an electronic device may indicate a UE generally used in communication engineering. However, embodiments of the present invention may be applied to an electronic device which may provide a voice call service over a packet-switched network. For example, electronic devices, such as smartphones or tablet PCs, for supporting VoLTE in an LTE network environment may correspond to the above-mentioned UEs or may simply correspond to terminals.

FIG. 1 is a block diagram of a UE, according to an embodiment of the present disclosure.

Referring to FIG. 1, a UE 100 may include a processor 110, a communication circuit 120, a first antenna 131 and a second antenna 132 connected to the communication circuit 120, a voice engine 140, a microphone 151, a speaker 153, a memory 160, and a display 170. In an embodiment of the present disclosure, at least one of the components of the UE 100 may be omitted from the UE 100, and another component may be additionally included in the UE 100. In addition, the components 110-170 in the UE 100 may be connected to each other through a bus. The bus may include a circuit which transmits communication (e.g., a control message and/or data) between the components 110-170.

The processor 110 may correspond to hardware having calculation capability, for example, a CPU or an AP. The communication circuit 120 may be a communication processor (CP) or a modem. In an embodiment of the present disclosure, the processor 110 and the communication circuit 120 may be included in one integrated circuit (IC) or chip, for example, a system on chip (SoC). The processor 110 or the communication circuit 120 may perform, for example, a calculation or process data associated with control and/or communication of another component of the UE 100.

The communication circuit 120 may be connected to the first antenna 131 and the second antenna 132. The communication circuit 120 may perform wireless communication using the first and second antennas 131 and 132. The wireless communication may correspond to, for example, at least one of LTE, LTE-advanced (LTE-A), code division multiple access (CDMA), wideband CDMA (WCDMA), universal mobile telecommunications system (UMTS), wireless broadband (WiBro), or global system for mobile communications (GSM) as a cellular communication protocol. In an embodiment of the present disclosure, a description is provided below with respect to a network (e.g., LTE, LTE-A, and the like) which supports a packet-based voice call (e.g., VoLTE).

The communication circuit 120 may allow a power management module (e.g., a power management integrated circuit (PMIC)) to feed power to an antenna and to perform an operation of searching a network and communicating a signal.

The UE 100 may include a plurality of antennas. For example, the UE 100 may include at least one transmit antenna and at least one receive antenna. For example, the transmit antenna may be the first antenna 131 and the receive antenna is the second antenna 132. The transmit antenna may operate as a receive antenna. If a user of the UE 100 performs a voice call using VoLTE, since data transmission (e.g., transmission of his or her voice packet) and data reception (e.g., reception of a called party's voice packet) are independently performed, the UE 100 may include two or more antennas. A first antenna (e.g., the first antenna 131) may establish an uplink channel with a base station, and a second antenna (e.g., the second antenna 132) may establish a downlink channel with the base station. The uplink channel and the downlink channel may have different frequency bands. In an embodiment of the present disclosure, if the UE 100 supports time division duplex (TDD) communication, an uplink channel and a downlink channel may have substantially the same frequency band. In the present disclosure, a description is provided below with respect to frequency division duplex (FDD) communication.

The voice engine 140 may convert speech of a user, obtained via the microphone 151, into a voice data packet (e.g. a voice packet). In addition, the voice engine 140 may decode a called party's voice packet received via the communication circuit 120 and may output the decoded voice packet to the speaker 153. The voice engine 140 may be a vocoder. Furthermore, the voice engine 140 may be implemented with hardware. In an embodiment of the present disclosure, the voice engine 140 may be implemented with part of the communication circuit 120 or part of an SoC. Moreover, the voice engine 140 may be implemented in the form of a software module.

The memory 160 may include a volatile and/or a non-volatile memory. The memory 160 may store, for example, a command or data associated with at least another component of the UE 100. According to an embodiment of the present disclosure, the memory 160 may store software and/or a program.

The display 170 may include, for example, a liquid crystal display (LCD), a light emitting diode (LED) display, an organic LED (OLED) display, a microelectromechanical systems (MEMS) display, or an electronic paper display. The display 170 may display, for example, a variety of content (e.g., text, an image, a video, an icon, or a symbol, and the like) to the user. The display 170 may include a touch screen, and may receive, for example, a touch, a gesture, a proximity input, or a hovering input using an electronic pen or part of a user's body.

Figure 2:
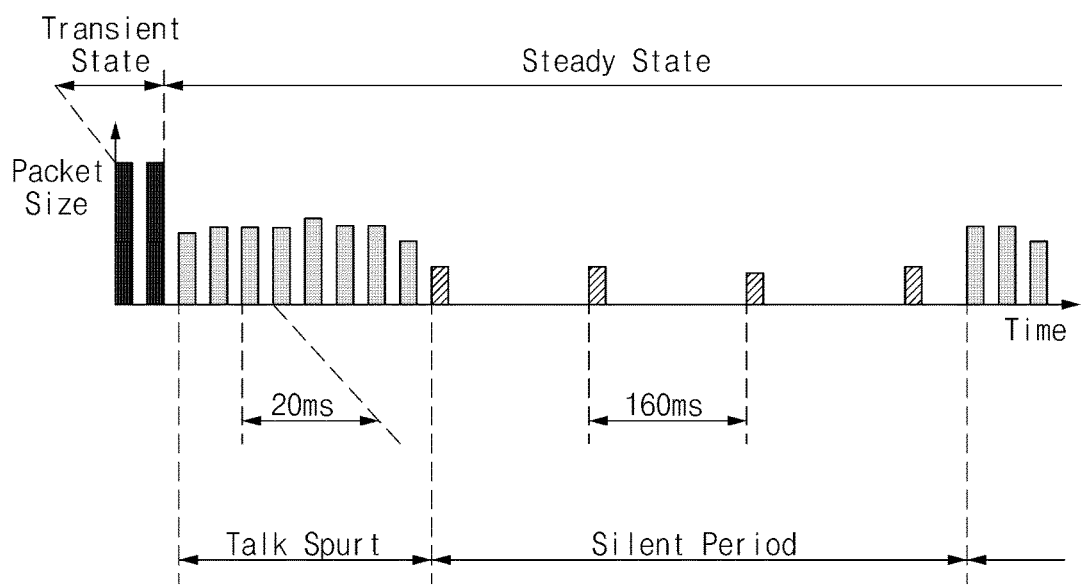
FIG. 2 is a diagram of a transmit pattern of a voice data packet, according to an embodiment of the present disclosure.

FIG. 2 is a diagram of a transmit pattern of a voice data packet, according to an embodiment of the present disclosure.

Referring to FIG. 2, the transmit pattern of a voice packet is at an adaptive multi rate (AMR) of 12.2 kbps in a voice call via VoLTE. The transmit pattern may be roughly classified into a transient state, where systematic data is transmitted when a voice call is started or whenever needed, and a steady state, where an actual voice call is performed. The steady state may be classified into a talk spurt period (e.g. a first period) where voice data is actually transmitted and a silent period (e.g. a second period), which is a mute period. In the case of AMR-wideband (AMR-WB), a transmitted voice packet may be increased in size based on a rate. In the case of VoLTE, a radio layer 2 (L2) header and an Internet protocol (IP) header may be added to voice data.

The first period may correspond to a period where a meaningful sound is obtained via the microphone 151 as well as a period where a user actually talks with a party (e.g. a called party). For example, the first period may correspond to a period where data to be transmitted via the communication circuit 120 is obtained via the microphone 151. The second period may correspond to a period where a user does not talk with the called party or where data to be sent is not obtained. However, to maintain a voice call state, the UE 100 may periodically transmit data in the second period. A transmit period (e.g., 160 ms) in the second period may be set to be relatively longer than a transmit period (e.g., 20 ms) in the first period to efficiently use radio resources.

A transient state period may be maintained about 40 ms to about 60 ms. In this period, for example, 95 bytes of data may be transmitted at intervals of 20 ms. In this case, a data transmission rate may be about 38 kbps.

The first period and the second period may be variably determined based on a voice call pattern of a user. For example, if a user talks with the called party for a voice call, the first period may occupy most of the entire voice call. However, if the user mainly listens to the called party during the voice call, the second period may occupy most of the entire voice call. As such, the first period and the second period may be operated to be independent of each other in a download or an upload based on a call pattern of a user. According to an embodiment of the present disclosure, the communication circuit 120 may secure a period (e.g., an idle period) where data is not transmitted or received as long as possible by overlapping at least part of a period where an upload operation is performed with a period where a download is performed, when the download is performed. Thus, the UE 100 may save power. In this regard, a detailed description is provided below with reference to FIG. 5.

For example, during a first period, the communication circuit 120 may transmit 35 to 40 bytes of data at intervals of 20 ms. In this case, the communication circuit 120 may have a data transmission rate of about 14 kbps to about 16 kbps. In addition, during the second period, the communication circuit 120 may transmit 10 to 15 bytes of data at intervals of 160 ms. In this case, the communication circuit 120 may have a data transmission rate of about 0.5 kbps to about 0.75 kbps. Such a transmit period and/or packet size may be modified in various ways based on a communication protocol, a communication mode, a type of a voice call, and the like. Hereinafter, a description is provided below of an operation of receiving data over a downlink and an operation of receiving data over an uplink if a CDRX period is 20 ms.

Figure 3A:
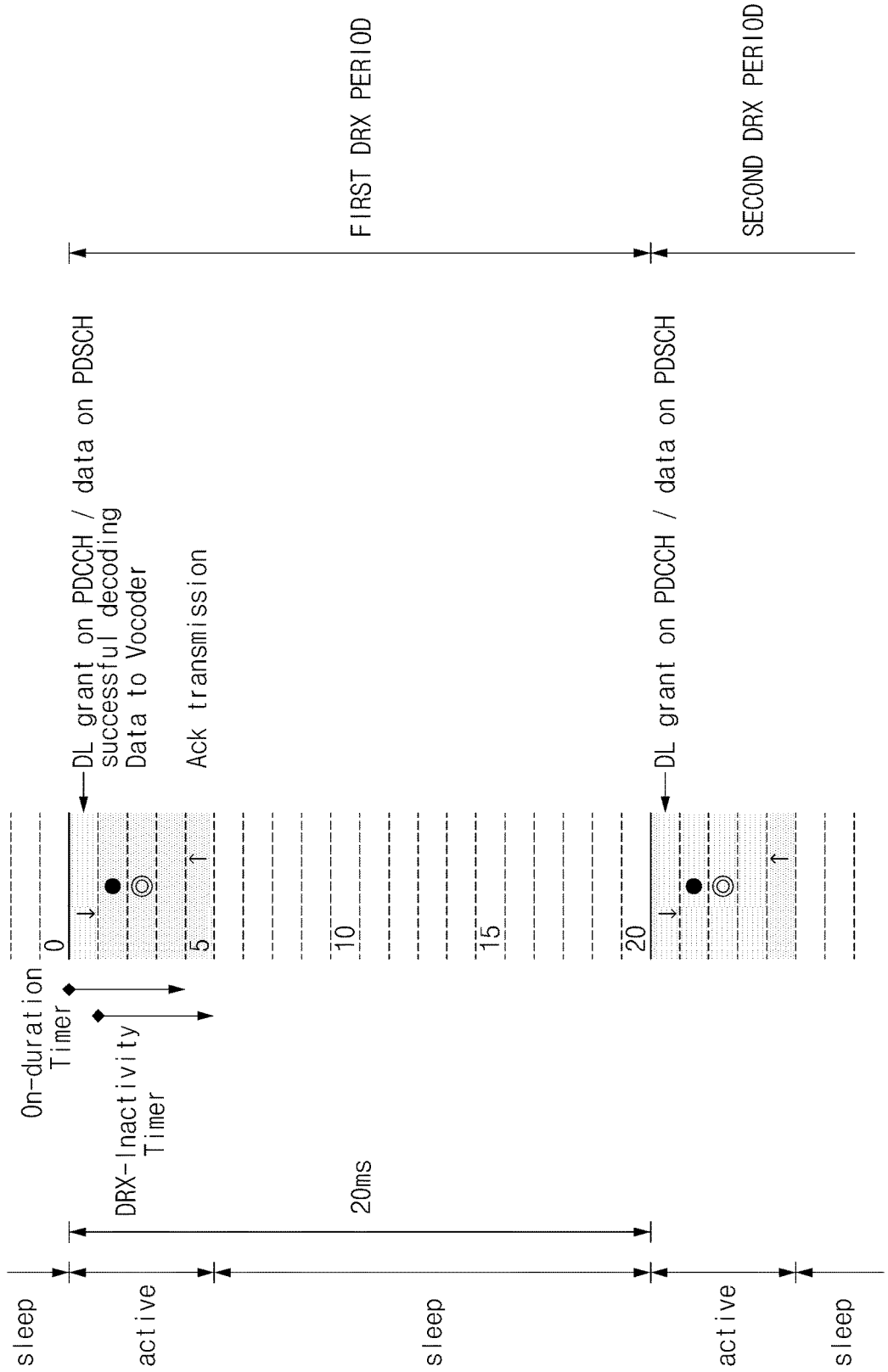
FIG. 3A is a diagram of a download operation of a UE to which CDRX is applied and to which SPS is not applied, according to an embodiment of the present disclosure.

FIG. 3A is a diagram of a download operation of a UE to which CDRX is applied and to which SPS is not applied, according to an embodiment of the present disclosure. An operation of a communication circuit 120 of FIG. 1 may be changed based on whether the CDRX and the SPS are applied in a VoLTE call. If the CDRX is not applied, since a UE 100 of FIG. 1 should monitor downlink (DL) data for each subframe, it may be relatively difficult to save power. Thus, in a state where the CDRX is applied, a description is provided below of an embodiment of the present disclosure where the SPS is applied or is not applied. In FIG. 3A and various accompanying drawings, an ideal situation which may differ from a real situation is assumed.

In an example shown in FIG. 3A, a discontinuous reception (DRX) (or CDRX) period may be set to 20 ms. In addition, an on-duration timer may be set to 4 ms. In the present disclosure, the CDRX period may correspond to a period when the communication circuit 120 performs an operation of receiving data. The on-duration timer may correspond to a time when the UE 100 (e.g., the communication circuit 120) waits for receiving a physical downlink control channel (PDCCH) in a downlink subframe after it is woken up by the DRX. If the PDCCH is successfully decoded, the communication circuit 120 maintains an active state and an inactivity timer may be started. In an embodiment of the present disclosure, a subframe may have a duration of 1 ms. The DRX period may include 20 subframes and the on-duration timer may include 4 subframes. In the example, if the communication circuit 120 enters an active state in a first DRX period and is not receiving any data from a base station, the communication circuit 120 may maintain the active state for the on-duration time (i.e., for 4 ms) and may enter an idle state. If 16 ms further elapses in this state, that is, if a second DRX period is started, the communication circuit 120 may enter the active state again and may wait to receive data.

In the example shown in FIG. 3A, the communication circuit 120 may be activated in the first DRX period. A DL grant may be received on a control channel (e.g., a PDCCH) and a voice packet may be received on a data channel (e.g., a physical downlink shared channel (PDSCH)), at a time of 1 ms (displayed as the symbol "↓"). A message received over the control channel may include a DRX-inactivity timer. The DRX-inactivity timer may correspond to a time when the communication circuit 120 waits from a time when decoding a PDCCH. In the example, if the DRX-inactivity timer is set to 4 ms or less, a time (a hatched region) when the communication circuit 120 maintains the active state may correspond to 5 ms. If the DRX-inactivity timer is set to 7 ms, the active state may be maintained for 8 ms.

In the example, a PDCCH may be decoded at a time of 2 ms (displayed as the symbol "●"). A received voice packet may be provided to a voice engine 140 of FIG. 1 (e.g., a vocoder) at a time of 3 ms (displayed as the symbol "☉"). A voice packet may be decoded by the voice engine 140, and the decoded voice packet may be output to the speaker 153 of FIG. 1.

The communication circuit 120 may transmit an ACK to a received hybrid automatic repeat request identification (HARQ ID) at a time of 5 ms (displayed as the symbol "↑"). However, a process of receiving data may be completed by the ACK transmission. FIG. 3A illustrates data transmission (e.g. ACK transmission) together with data reception. An ACK transmission may be performed over an uplink channel. Such a transmit pattern may be repeated in the second DRX period or a subsequent DRX period. Parameters such as the on-duration timer and the DRX-inactivity timer or a time when an ACK is transmitted may be changed for each DRX period by the contents of a control message transmitted from a base station, an environment of a network, and the like. Thus, a time when the communication circuit 120 maintains an active state or a time when the communication circuit 120 maintains an idle state may also be changed.

In the example, assuming that there is no data transmission except for the displayed ACK transmission, a period (e.g., a reduced power, or sleep, period) where the communication circuit 120 may not transmit or receive data may be 15 ms, and the communication circuit 120 may operate in a power saving mode during this period. However, this does not indicate that the communication circuit 120 may actually enter a sleep period for 15 ms. The sleep period of 15 ms may include both a processing time for gating or turning off a certain block and a setup and stabilization time necessary for driving a corresponding block. In other words, a period where the communication circuit 120 may actually enter a sleep period and a block which may be turned off may be changed based on a hardware implementation of the UE 100 or the communication circuit 120.

In the present disclosure, the sleep period may not indicate that a voice call is terminated and power supplied to the communication circuit 120 is blocked. The sleep period may be a period where the communication circuit 120 and the UE 100 may reduce power consumption, for example, where the UE 100 temporarily stops an operation of supplying current to an antenna or stops an operation of the voice engine 140, since it does not transmit or receive data. The expression "sleep period" may be replaced with "inactive period" or "idle period," and the like.

Figure 3B:
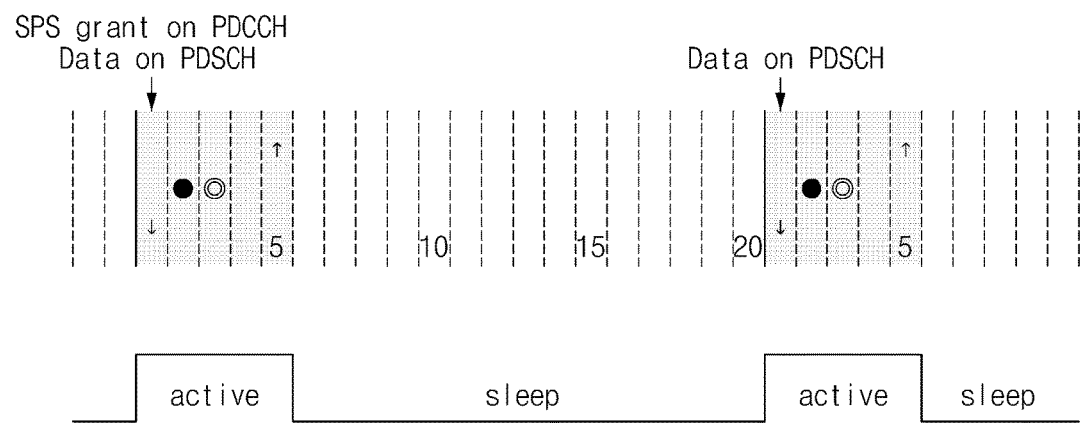
FIG. 3B is a diagram of a download operation of a UE to which CDRX and SPS are applied, according to an embodiment of the present disclosure.

FIG. 3B is a diagram of a download operation of a UE to which CDRX and SPS are applied, according to an embodiment of the present disclosure. For example, if an SPS resource is allocated through an SPS grant on a PDCCH in a certain DRX period (e.g., if another configuration message is not received), the UE 100 of FIG. 1 may start to receive data on a PDSCH in a subsequent DRX period without receiving a DL grant. Except for the difference, a data download may be performed using the same scenario as that shown in FIG. 3A.

Hereinafter, a description is provided of an upload scenario using FIGS. 4A and 4B. An upload scenario (e.g. an operation of transmitting a voice packet of a user) may progress to be independent of the download scenario (e.g., an operation of receiving a called party's voice packet) described with reference to FIGS. 3A and 3B.

Figure 4A:
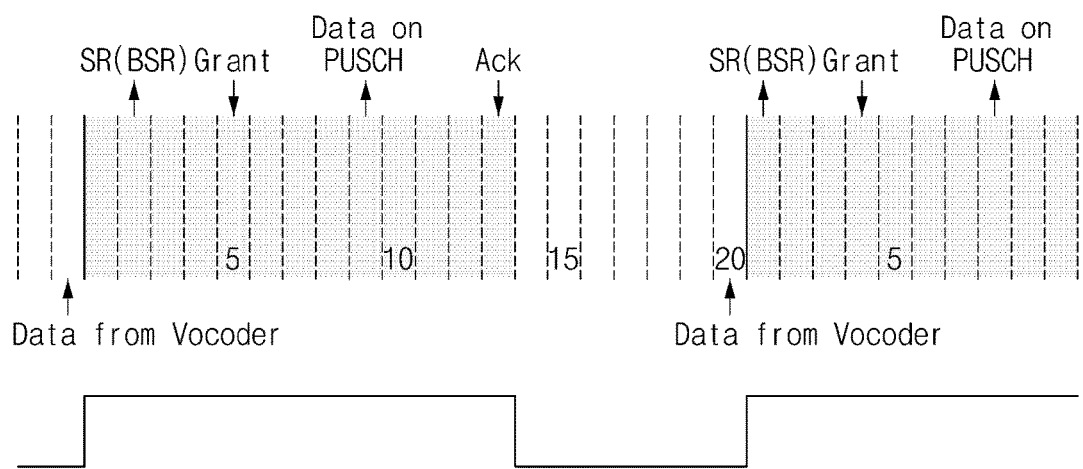
FIG. 4A is a diagram of an upload operation of a UE to which CDRX is applied and to which SPS is not applied, according to an embodiment of the present disclosure.

FIG. 4A is a diagram of an upload operation of a UE to which CDRX is applied and to which SPS is not applied, according to an embodiment of the present disclosure.

If voice data is obtained from a user in a voice call connection state, a voice engine 140 of FIG. 1 may generate a voice data packet and may provide the generated voice data packet to the communication circuit 120 of FIG. 1 to transmit the voice data packet. If the voice packet is received from the voice engine 140, the communication circuit 120 may trigger the received voice packet, and may start to perform an upload operation. In this case, the voice packet may be temporarily stored in a buffer accessible by the communication circuit 120.

Referring to FIG. 4A, the communication circuit 120 may request a base station at a time of 2 ms to allocate resources for an upload. For example, the communication circuit 120 may transmit a scheduling request (SR) for an upload to the base station. A grant may be received at a time of 5 ms in response to the transmission. The communication circuit 120 may upload the voice packet at a time of 9 ms on a physical uplink shared channel (PUSCH). If an ACK is received at a time of 13 ms from the base station, the communication circuit 120 may enter a sleep period for 7 ms until a subsequent voice data transmission request is received from the voice engine 140 (e.g., until a time of 20 ms in the example).

However, if the SR is not sufficiently granted, for example, if it is determined that it is difficult to transmit all of the voice packets stored in the buffer using radio resources allocated from the base station, the communication circuit 120 may transmit a buffer status report (BSR) to the base station and may transmit a voice packet to be newly granted. In this regard, a description of this is provided below with reference to FIG. 4B.

Figure 4B:
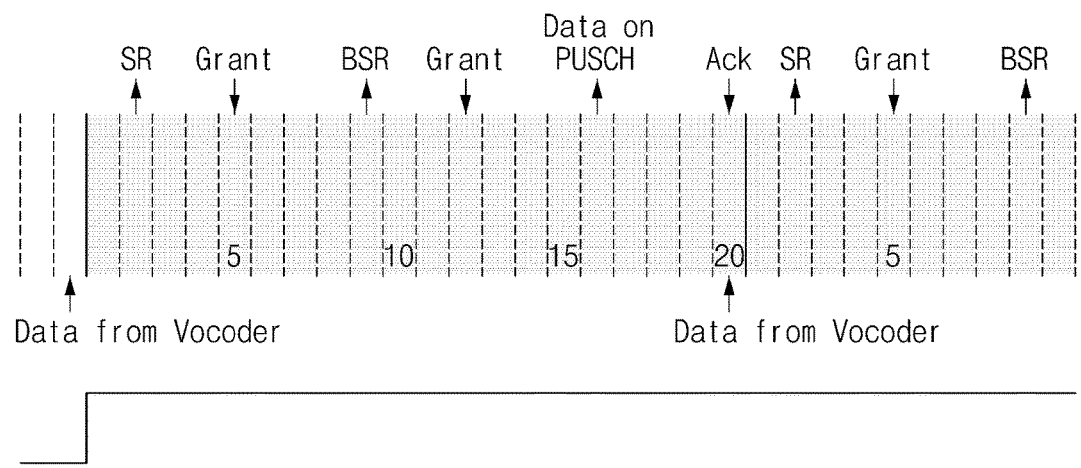
FIG. 4B is a diagram of an upload operation of a UE to which CDRX is applied and to which SPS is not applied, according to an embodiment of the present disclosure.

FIG. 4B is a diagram of an upload operation of a UE to which CDRX is applied and to which SPS is not applied, according to an embodiment of the present disclosure.

In an example shown in FIG. 4B, an SR may be transmitted at a time of 2 ms, and a grant may be received at a time of 5 ms. However, since granted resources are insufficient to transmit a voice packet, a BSR may be transmitted at a time of 9 ms and a new grant may be received at a time of 12 ms. In this case, the communication circuit 120 may transmit a voice packet at a time of 16 ms on a PUSCH and may receive an ACK at a time of 20 ms to end the transmission process.

However, as described above with reference to FIG. 2, data transmission may occur at intervals of 20 ms in a first period (or a talk spurt period), thus the communication circuit 120 may continuously maintain an active state without entering a sleep period.

Figure 4C:
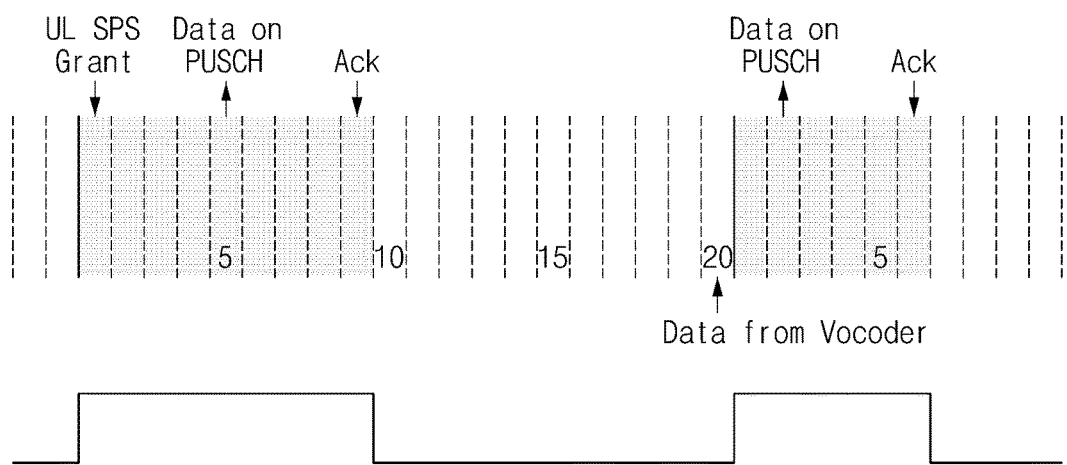
FIG. 4C is a diagram of an upload operation of a UE to which CDRX and SPS are applied, according to an embodiment of the present disclosure.

FIG. 4C is a diagram of an upload operation of a terminal to which CDRX and SPS are applied, according to an embodiment of the present disclosure.

Referring to FIG. 4C, if the SPS is applied, as long as there are no special circumstances, a communication circuit 120 of FIG. 1 may transmit data without an SR or a grant process to transmit a voice packet in a subsequent period. Thus, as shown in FIG. 4C, if a UL SPS grant is obtained in a period, a UE 100 of FIG. 1 may maintain an active state of the communication circuit 120 for a total of 9 ms in the corresponding period until receiving an ACK. However, since the grant process is omitted in a subsequent period, the UE 100 may maintain the active state of the communication circuit 120 for 6 ms until receiving an ACK.

Figure 5:
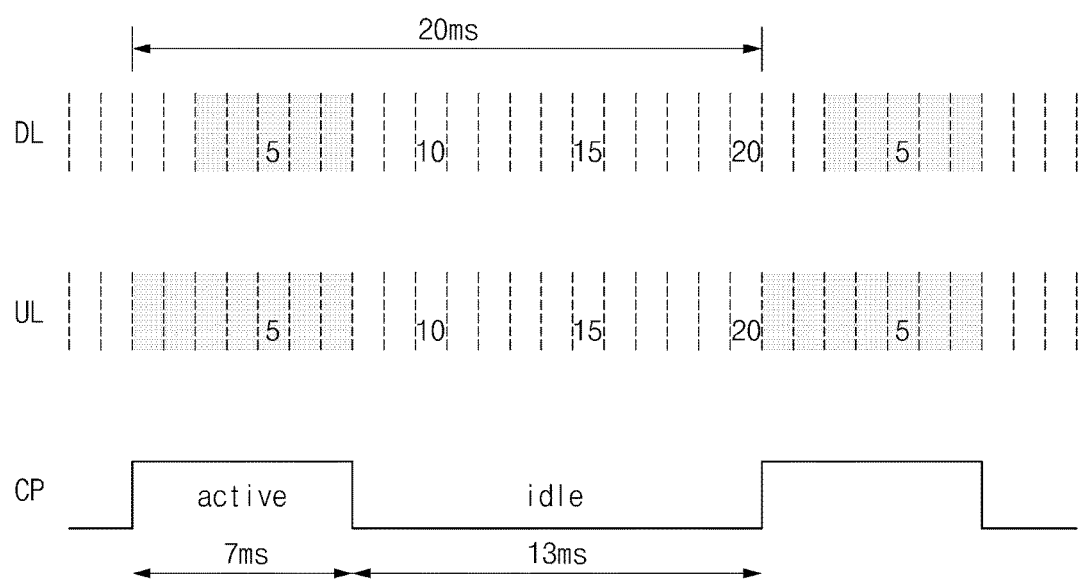
FIG. 5 is a diagram of an active/idle state of a communication circuit of a UE in download and upload conditions, according to an embodiment of the present disclosure.

FIG. 5 is a diagram of an active/idle state of a communication circuit in a UE in download and upload conditions, according to an embodiment of the present disclosure.

In an example shown in FIG. 5, when performed on a period of 20 ms, a communication circuit 120 (e.g., a CP) may perform a download in a period of 3 ms to 7 ms (or may maintain an on-duration period without performing a download) and may perform an upload in a period of 1 ms to 7 ms. In this case, the CP may maintain an active state for 7 ms and may maintain an idle state for 13 ms. In other words, the CP may maintain the active state for a period corresponding to a sum of a download period and an upload period and may maintain the idle state in a period where both download and upload are not performed.

If an upload period is the same as that of the example, but if a download is performed in a period of 12 ms to 16 ms, the CP may enter the active state in a period of 1 ms to 7 ms, may enter the idle state in a period of 8 ms to 11 ms, may enter the active state in a period of 12 ms to 16 ms, and may enter the idle state in a period of 17 ms to 20 ms. In an actual operation, due to the time required for wake-up and stabilization, the CP may continuously maintain the active state, or power consumption may increase as compared to if the active state is continuously maintained. Thus, if the communication circuit 120 may overlap an upload period with a download period as long as possible to secure an idle period as long as possible, power may be saved. Since the communication circuit 120 performs only a passive operation for a download during a voice call, the communication circuit 120 may control an upload schedule and may adjust download-upload sync to adjust an overlapped period as shown in FIG. 5. In this regard, a description of this is provided below with reference to FIG. 6.

Figure 6:
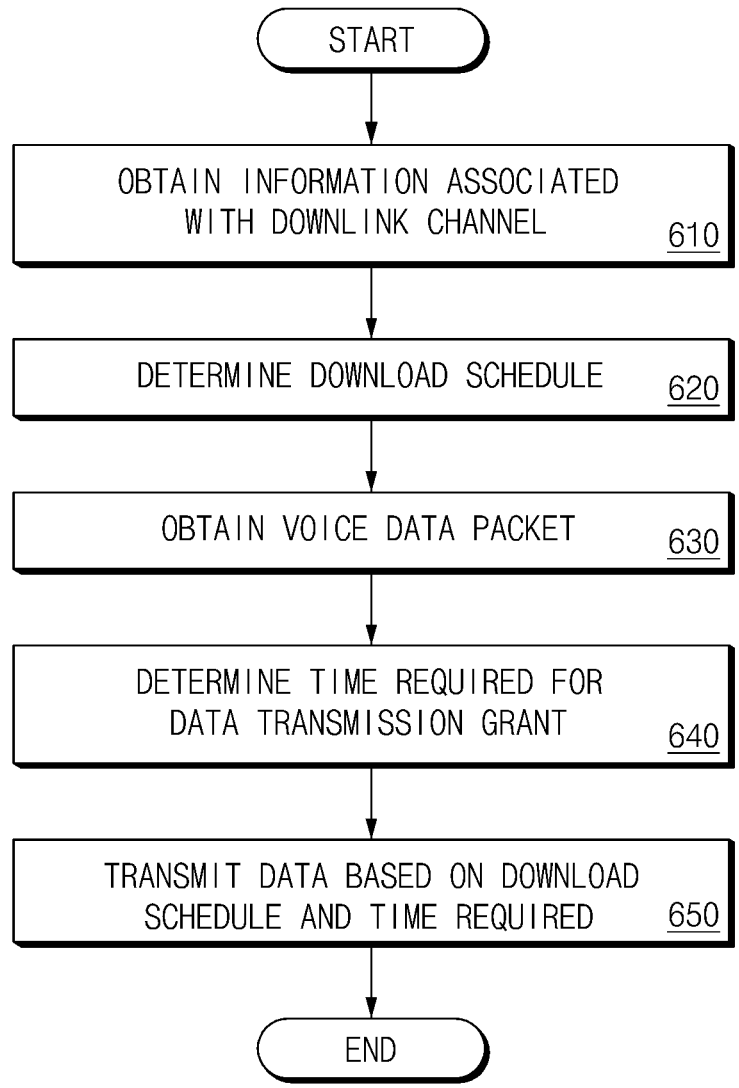
FIG. 6 is a flowchart of a method of controlling an upload schedule of a UE, according to an embodiment of the present disclosure.

FIG. 6 is a flowchart of a method of controlling an upload schedule of a UE, according to an embodiment of the present disclosure.

Referring to FIG. 6, in operation 610, a UE 100 of FIG. 1 may obtain information associated with a downlink channel. For example, a communication circuit 120 of FIG. 1 may obtain parameter values, such as a DRX period (e.g., 20 ms) and an on-duration timer (e.g., 5 ms), obtained in the DRX period.

In operation 620, the UE 100 may determine a download schedule. In other words, the communication circuit 120 may determine a time when it should be activated for a download in a subsequent DRX period. As long as there are no special circumstances, the UE 100 may determine whether to perform a download or whether to wait for a download, for a minimum of some milliseconds by the DRX period and the on-duration timer.

In operation 630, the UE 100 may obtain a voice data packet. For example, speech obtained via a microphone 151 of FIG. 1 may be provided to the communication circuit 120 by being packetized by a voice engine 140 of FIG. 1.

Figure 9:
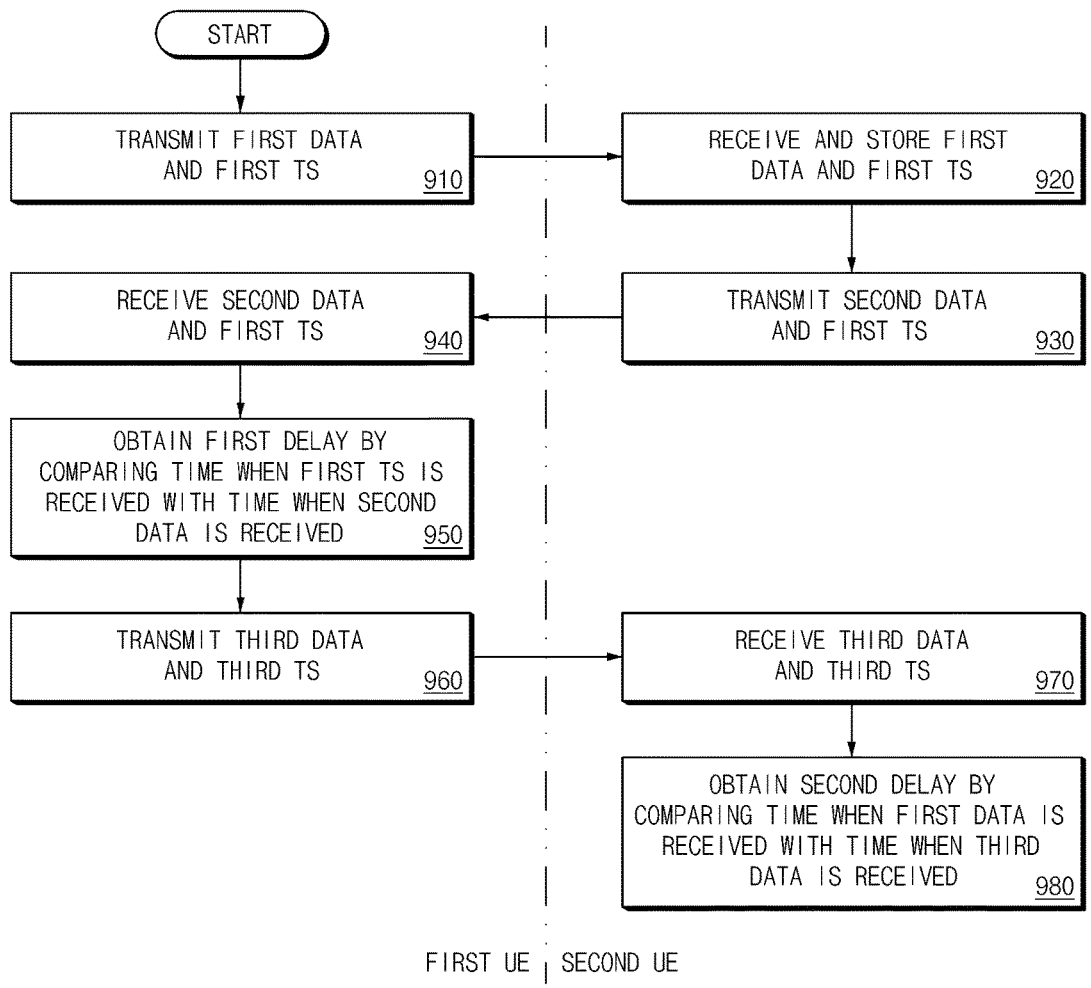
FIG. 9 is a flowchart of a method of measuring a delay which may occur between a plurality of terminals, according to an embodiment of the present disclosure.
Figure 10:
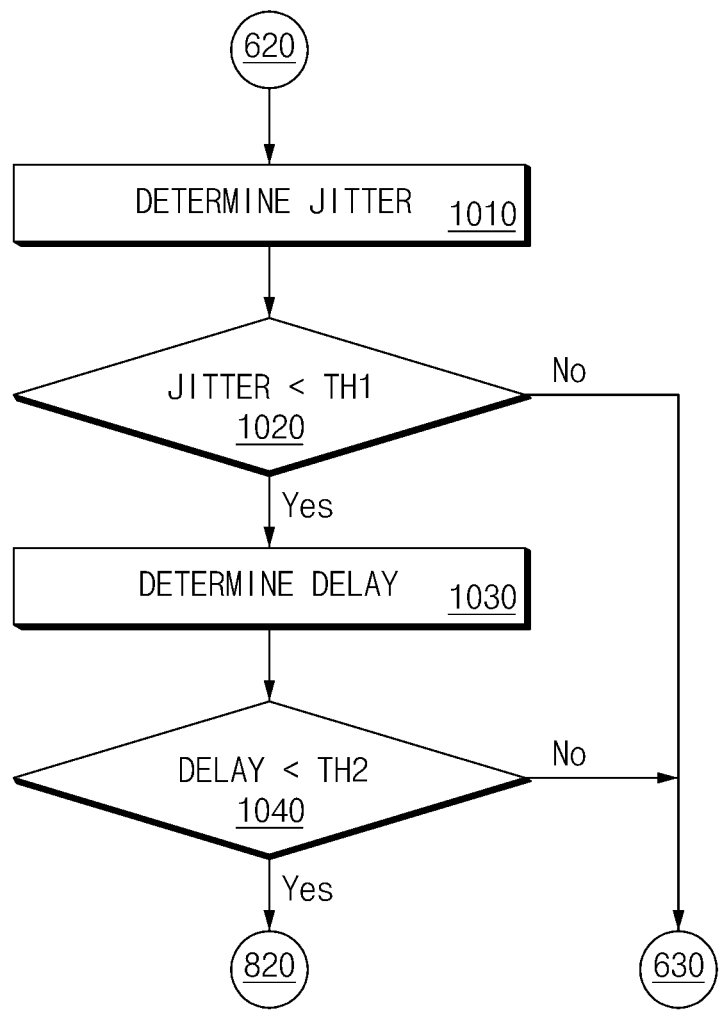
FIG. 10 is a flowchart of a method of controlling an upload schedule of a UE based on various conditions, according to an embodiment of the present disclosure.

In connection with a process shown in FIG. 6, 9, or 10, an order where operations are performed may be changed unless logically inconsistent with each other. For example, obtaining the voice data packet in operation 630 may be performed before operations 610 or 620.

In operation 640, the communication circuit 120 may determine a time required until a data transmission is granted. For example, the communication circuit 120 may learn a time required from a time when transmitting an SR or BSR to a grant time. For example, the communication circuit 120 may set an average time required from the time when transmitting the SR or BSR or the grant time to a time required. Alternatively, the communication circuit 120 may determine a time required in a different way based on a network status. For example, if the network status is good, the communication circuit 120 may set a time required to 3 ms. If the network status is relatively bad, the communication circuit 120 may set a time required to 5 ms.

In an embodiment of the present disclosure, since the transmission of the SR or BSR is omitted if SPS is applied in an uplink, the communication circuit 120 may transmit a voice packet on a PUSCH, and the like, in consideration of a download schedule rather than transmitting the SR or BSR.

In operation 650, the UE 100 may perform a transmit operation of a voice packet based on the download schedule and the determined time required. For example, if a voice packet is received from the voice engine 140, the communication circuit 120 may transmit an SR or BSR based on a predicted download schedule rather than transmitting the SR or BSR. For example, the communication circuit 120 may transmit the SR to the base station such that at least part of a download period predicted by the download schedule overlaps with an upload period predicted by a transmit operation of a voice packet. When the overlapped period is longer, the communication circuit 120 may more easily secure a period where it may enter an idle state. Thus, the communication circuit 120 may transmit the SR or BSR such that the overlapped period is as long as possible. For example, the communication circuit 120 may transmit the SR or BSR after waiting for about 3 ms to about 5 ms after receiving a voice packet.

Figure 7:
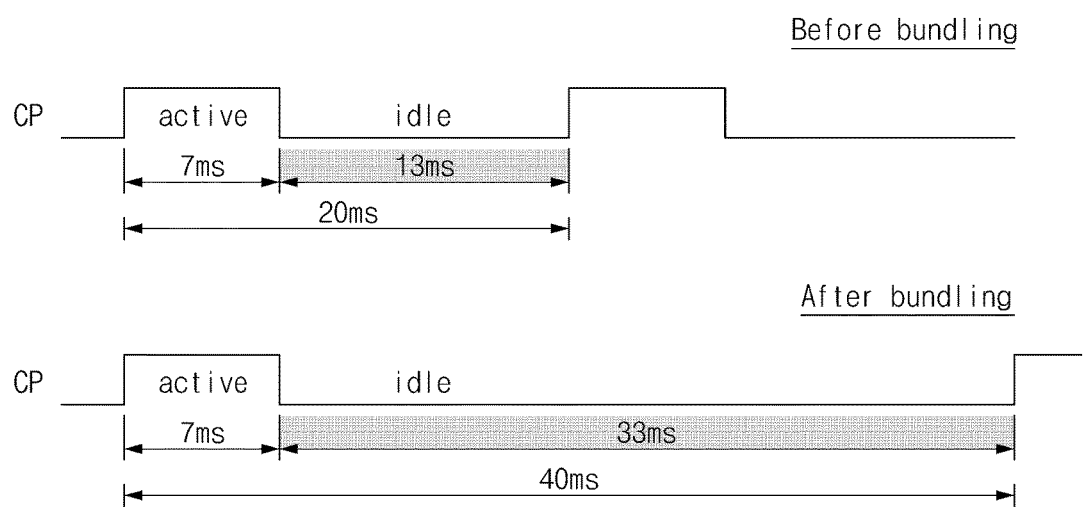
FIG. 7 is a diagram of an active/idle state of a communication circuit in conditions where voice data packets are bundled, according to an embodiment of the present disclosure.

FIG. 7 is a diagram of an active/idle state of a communication circuit in conditions where voice data packets are bundled, according to an embodiment of the present disclosure.

Referring to FIG. 7, if SPS is not applied, for example, if an SPS grant is not included in a message received on a PDCCH, a power saving effect may be relatively reduced only by adjusting sync between an upload period and a download period. In this case, a bundling mode for changing a CDRX period to double CDRX periods may be applied. For example, if a DRX operation is performed at intervals of 20 ms, voice data may be transmitted and received at intervals of 40 ms.

According to an embodiment of the present disclosure, a voice packet or a silence insertion descriptor (SID) packet should be periodically transmitted and received for a VoLTE call. In the present disclosure, the voice packet may correspond to a packet transmitted and received in a first period (e.g., a talk spurt period), and the SID packet may correspond to a packet transmitted and received in a second period (e.g., a silence period). Since a call connection is released if the SID packet is not transmitted and received every 160 ms, it is difficult to adjust a period. However, although the voice packet is transmitted and received every 40 ms, there may be a very low possibility that a call connection will be released. Therefore, as shown in FIG. 7, voice packet transmission operated at intervals of 20 ms before bundling may be performed at intervals of 40 ms by bundling two DRX periods to increase the entire idle period. A process associated with this is described below with reference to FIG. 8.

Figure 8:
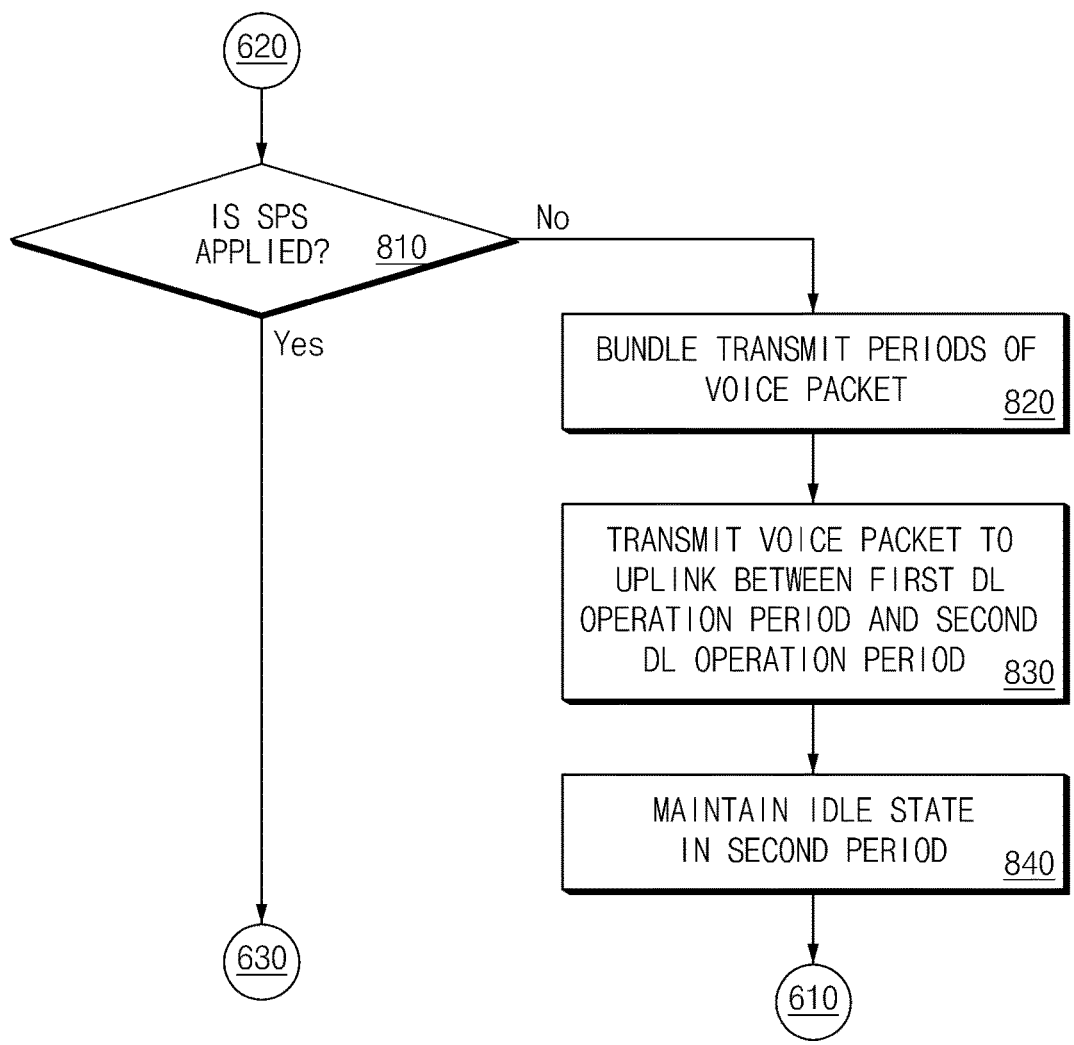
FIG. 8 is a flowchart of a method of bundling a voice data packet, according to an embodiment of the present disclosure.

FIG. 8 is a flowchart of a bundling method of a voice data packet, according to an embodiment of the present disclosure.

Referring to FIG. 8, the method may be performed after operation 620 of FIG. 6, where the "YES" result at operation 810 proceeds to operation 630 of FIG. 6, and the result of operation 840 proceeds to operation 610 of FIG. 6. However, the process of FIG. 8 may also be performed after operation 630 of FIG. 6. In this case, the "YES" result of operation 810 may proceed to operation 640 of FIG. 6.

In addition, for example, if a first UE performs the process of FIG. 8, the process of FIG. 8 may be applied if a second UE which performs a voice call with the first UE also supports bundling, according to an embodiment of the present disclosure. If the first UE supports bundling and if the second UE does not support bundling, the first UE as well as the second UE may not perform bundling. For this purpose, before performing bundling in operation 820 (e.g., before operation 810 or between operation 810 and operation 820), the first UE may determine whether the second UE supports bundling. In this regard, a description is provided below with reference to FIG. 9.

In operation 810, a communication circuit 120 of FIG. 1 may determine whether SPS is applied, from information associated with a downlink channel. If the SPS is applied, the communication circuit 120 may proceed to operation 630 of FIG. 6 and may perform an operation of transmitting a voice packet in FIG. 6.

If the SPS is not applied, in operation 820, the communication circuit 120 may bundle transmit periods of a voice packet. For example, the communication circuit 120 may bundle a first period of 20 ms and a second period of 20 ms. In this case, the bundled period may be 40 ms.

In operation 830, the communication circuit 120 may locate an uplink operation period between a download operation period (e.g., an on-duration period) of the first period and a download operation period of the second period. In this case, in operation 840, the communication circuit 120 may enter an idle state after the download operation period of the second period.

Such bundling may be adaptively turned on/off in consideration of a delay or network status. For example, if the network status deteriorates or if the delay is increased, the communication circuit 120 may release the bundling and may retransmit a voice packet at intervals of 20 ms. In other words, if a transmit period of a voice packet is increased, the communication circuit 120 may relatively further secure an idle period, but there may be a possibility that availability will be reduced since a called party's voice is delayed to a user (or if a user's voice is delayed to a called party) or since call quality is reduced. Therefore, there is a need for a method of verifying whether to increase a transmit period of a voice packet in network conditions that maintain call quality. A description of the method is provided below with reference to FIG. 9.

FIG. 9 is a flowchart of a method of measuring a delay which may occur between a plurality of UEs, according to an embodiment of the present disclosure.

According to an embodiment of the present disclosure, if a first UE and a second UE perform a VoLTE call, the first UE and the second UE may verify an end-to-end delay by exchanging data of a previously defined format between the first UE and the second UE. For example, the first UE and the second UE may transmit a voice packet to which previously defined data is attached, include the previously defined data in an SID, use a real-time transport protocol (RTP) control protocol extended reports (RTCP XR) block, or may use an RTCP based feedback (RTP/AVPF).

The method of FIG. 9 may be performed at a suitable time. For example, the method of FIG. 9 may be performed at a time when a channel for a voice call using VoLTE is established. Additionally, or alternatively, the method of FIG. 9 may be periodically or randomly performed to reflect a change of a call environment such as a network status during a voice call.

Referring to FIG. 9, in operation 910, the first UE may transmit local time (e.g., first timestamp (TS)) information of the first UE together with first data to the second UE. In operation 920, the second UE may receive the first data and the first TS.

If bundling is supported, the second UE may store a time when the first data is received. In operation 930, the second UE may transmit the first TS together with the second data to the first UE. In an embodiment of the present disclosure, the first data and the second data may be previously defined data and may be substantially the same data.

If the first UE and the second UE support bundling, the second UE may be previously defined to perform operations 920 and 930. In other words, if specified data is received that includes a TS from a called party's UE, the UE which supports bundling may store the TS and transmit the specified data to the first UE. If the first UE does not perform operation 940, since the second UE does not perform operation 920 and/or operation 930, that is, if the first UE does not receive the data including the first TS from the second UE, the first UE may determine that the second terminal does not support bundling. Alternatively, if an error message is received from the second terminal or a message is received that indicates that the second UE does not support bundling from the second UE, the first UE may determine that the second UE does not support bundling. In this case, the method of FIG. 9 may be stopped, and the first UE (e.g., a UE 100 of FIG. 1) may continuously perform an uplink timing control operation in operation 630 of FIG. 6.

In operation 940 of FIG. 9, the first UE may receive the second data and the first TS. In operation 950, the first UE may obtain a first delay by comparing a time when the first TS is received with a time when the second data is received. In the present disclosure, the first delay may include a time required for transmitting data and processing and response delays required when the second UE processes data and responds.

In operation 960, the first UE may transmit third data and a third TS to the second UE. In the present disclosure, the third TS may correspond to a local time of the first UE at a time when the third data is transmitted.

In operation 970, the second UE may receive the third data and the third TS. In operation 980, the second UE may obtain a delay by calculating a difference between a local time when data is currently received and a previously recorded time.

Referring to the method of FIG. 9, both of the first UE and the second UE may obtain a delay value with their called party's UE (e.g., the end-to-end delay plus the processing delay plus the response delay) by exchanging a data packet three times. The delay value may be monitored through one transmission or periodic transmissions.

FIG. 10 is a flowchart of a method of controlling an upload schedule of a UE based on various conditions, according to an embodiment of the present disclosure. The method of FIG. 10 may be performed if the above-mentioned several conditions are applied.

In operations 610 and 620 of FIG. 6, a UE 100 of FIG. 1 may verify whether CDRX and SPS are applied (e.g. granted) and verify various parameter values (e.g., an on-duration timer).

In operation 1010, the UE 100 may determine a jitter used for a VoLTE call to determine whether a modulation value of voice data is less than a threshold TH1 (e.g., 50 ms). If the jitter is greater than the threshold TH1 in operation 1020, since it is highly likely that apply bundling of increasing a transmit period of a voice packet will cause a problem in call quality, the UE 100 may proceed to operation 630 of FIG. 6 to perform the method of FIG. 6.

If the jitter is less than the threshold TH 1 in operation 1020, in operation 1030, the UE 100 may exchange previously defined data with a UE which performs a voice call with the UE 100 and may determine a delay. If the delay is determined to be less than a threshold TH2 (e.g., 400 ms), the UE 100 may proceed to operation 820 of FIG. 8 and apply bundling. If the delay is greater than the threshold TH2, the UE 100 may proceed to operation 630 in FIG. 6 to perform the method of FIG. 6.

Figure 11:
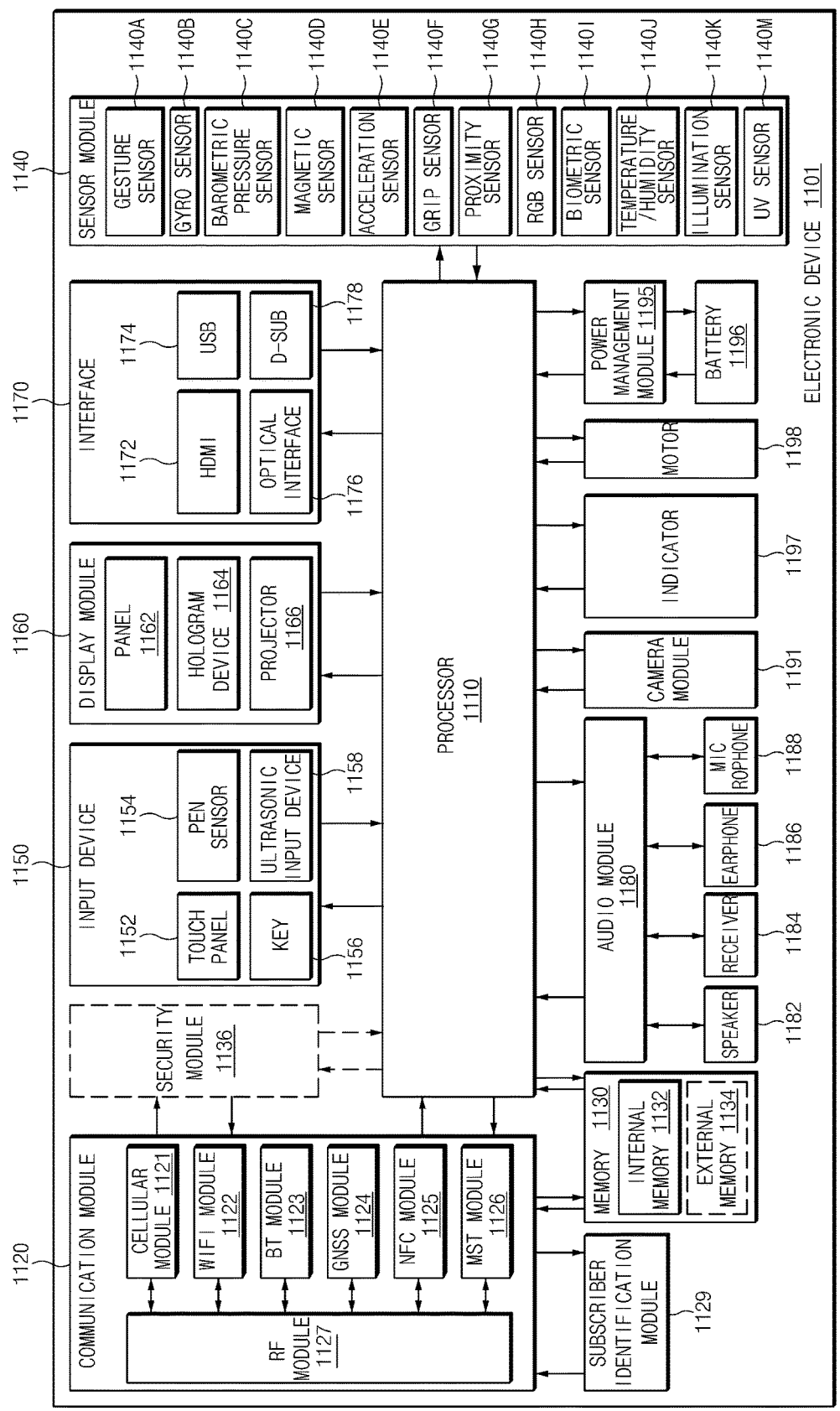
FIG. 11 is a block diagram of an electronic device according to an embodiment.

FIG. 11 is a block diagram of an electronic device 1101, according to an embodiment of the present disclosure.

Referring to FIG. 11, the electronic device 1101 may include, for example, a part or the entirety of the UE 100 illustrated in FIG. 1. The electronic device 1101 may include at least one processor (e.g., an AP) 1110, a communication module 1120, a subscriber identification module (SIM) 1129, a memory 1130, a sensor module 1140, an input device 1150, a display module 1160, an interface 1170, an audio module 1180, a camera module 1191, a power management module 1195, a battery 1196, an indicator 1197, and a motor 1198.

The processor 1110 may execute, or run, an operating system (OS) or an application program so as to control a plurality of hardware or software elements connected to the processor 1110, process various data, and perform operations. The processor 1110 may be implemented with, for example, an SoC. According to an embodiment of the present disclosure, the processor 1110 may further include a graphics processing unit (GPU) and/or an image signal processor. The processor 1110 may include at least a portion (e.g., a cellular module 1121) of the elements illustrated in FIG. 11. The processor 1110 may load, on a volatile memory, an instruction or data received from at least one of the other elements (e.g., a nonvolatile memory) to process the instruction or data, and may store various data in a nonvolatile memory.

The communication module 1120 may be configured the same as or similar to that of the communication circuit 120 of FIG. 1. The communication module 1120 may include, for example, a cellular module 1121 (e.g., a modem), a WiFi module 1122, a Bluetooth module 1123, a global navigation satellite system (GNSS) module 1124 (e.g., a global positioning system (GPS) module, a global navigation satellite system (GLONASS) module, a BeiDou navigation satellite system module, or a Galileo global navigation satellite system module), a near field communication (NFC) module 1125, a magnetic secure transmission (MST) module 1126, and a radio frequency (RF) module 1127.

The cellular module 1121 may provide, for example, a voice call service, a video call service, a text message service, or an Internet service through a communication network. The cellular module 1121 may identify and authenticate the electronic device 1101 in the communication network using the SIM 1129 (e.g., a SIM card). The cellular module 1121 may perform at least a part of the functions that may be provided by the processor 1110. The cellular module 1121 may include a CP.

Each of the WiFi module 1122, the Bluetooth module 1123, the GNSS module 1124, the NFC module 1125, and the MST module 1126 may include, for example, a processor for processing data transmitted/received through the modules. According to an embodiment of the present disclosure, at least a part (e.g., two or more) of the cellular module 1121, the WiFi module 1122, the Bluetooth module 1123, the GNSS module 1124, the NFC module 1125, and the MST module 1126 may be included in a single integrated circuit (IC) or IC package.

The RF module 1127 may transmit/receive, for example, communication signals (e.g., RF signals). The RF module 1127 may include, for example, a transceiver, a power amplifier module (PAM), a frequency filter, a low noise amplifier (LNA), an antenna, or the like. According to an embodiment of the present disclosure, at least one of the cellular module 1121, the WiFi module 1122, the Bluetooth module 1123, the GNSS module 1124, the NFC module 1125, or the MST module 1126 may transmit/receive RF signals through a separate RF module.

The SIM 1129 may include, for example, an embedded SIM and/or a card containing the SIM, and may include unique identification information (e.g., an integrated circuit card identifier (ICCID)) or subscriber information (e.g., an international mobile subscriber identity (IMSI)).

The memory 1130 (e.g., the memory 160 of FIG. 1) may include, for example, an internal memory 1132 or an external memory 1134. The internal memory 1132 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1134 may include a flash drive such as a compact flash (CF) drive, a secure digital (SD) drive, a micro-SD drive, a mini-SD drive, an extreme digital (xD) drive, a multi media card (MMC), a memory stick, or the like. The external memory 1134 may be operatively and/or physically connected to the electronic device 1101 through various interfaces.

A security module 1136, which is a module including a storage space that is more secure (e.g. has a higher security level) than the memory 1130, may be a circuit for providing secure data storage and protected execution circumstances. The security module 1136 may be implemented with an additional circuit and may include an additional processor. The security module 1136 may be present in an attachable smart chip or SD card, or may include an embedded secure element (eSE), which is installed in a fixed chip. Additionally, the security module 1136 may be driven in another OS which is different from the OS of the electronic device 1101. For example, the security module 1136 may operate based on a java card open platform (JCOP) OS.

The sensor module 1140 may, for example, measure a physical quantity or detect an operation state of the electronic device 1101 so as to convert measured or detected information into an electrical signal. The sensor module 1140 may include, for example, at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., a red/green/blue (RGB) sensor), a biometric sensor 1140I, a temperature/humidity sensor 1140J, an illumination sensor 1140K, or an ultraviolet (UV) light sensor 1140M. Additionally, or alternatively, the sensor module 1140 may include, for example, an olfactory sensor (e.g., an electronic nose (E-nose) sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1140 may further include a control circuit for controlling at least one sensor included therein. In an embodiment of the present disclosure, the electronic device 1101 may further include a processor configured to control the sensor module 1140 as a part of the processor 1110 or separately, so that the sensor module 1140 is controlled while the processor 1110 is in a reduced power, or sleep, state.

The input device 1150 may include, for example, a touch panel 1152, a (digital) pen sensor 1154, a key 1156, or an ultrasonic input device 1158. The touch panel 1152 may employ at least one of a capacitive method, a resistive method, an infrared method, and an ultraviolet light sensing method. The touch panel 1152 may further include a control circuit. The touch panel 1152 may further include a tactile layer so as to provide a haptic feedback to a user.

The (digital) pen sensor 1154 may include, for example, a sheet for recognition which is a part of a touch panel or is separate. The key 1156 may include, for example, a physical button, an optical button, or a keypad. The ultrasonic input device 1158 may sense ultrasonic waves generated by an input tool through a microphone 1188 so as to identify data corresponding to the ultrasonic waves sensed.

The display module 1160 (e.g., the display 170 of FIG. 1) may include a panel 1162, a hologram device 1164, or a projector 1166. The panel 1162 may be configured the same as or similar to that of the display 170 of FIG. 1. The panel 1162 may be, for example, flexible, transparent, or wearable. The panel 1162 and the touch panel 1152 may be integrated into a single module. The hologram device 1164 may display a stereoscopic image in a space using a light interference phenomenon. The projector 1166 may project light onto a screen so as to display an image. The screen may be disposed internally or externally to the electronic device 1101. According to an embodiment of the present disclosure, the display module 1160 may further include a control circuit for controlling the panel 1162, the hologram device 1164, or the projector 1166.

The interface 1170 may include, for example, a high definition multimedia interface (HDMI) 1172, a universal serial bus (USB) 1174, an optical interface 1176, or a D-subminiature (D-sub) connector 1178. The interface 1170, for example, may be included in the communication circuit 120 of FIG. 1. Additionally, or alternatively, the interface 1170 may include, for example, a mobile high-definition link (MHL) interface, an SD/MMC interface, or an Infrared Data Association (IrDA) interface.

The audio module 1180 may convert, for example, a sound into an electrical signal or vice versa. The audio module 1180 may process sound information input or output through a speaker 1182, a receiver 1184, an earphone 1186, or the microphone 1188.

The camera module 1191 is, for example, a device for taking a still image or a video. According to an embodiment of the present disclosure, the camera module 1191 may include at least one image sensor (e.g., a front sensor or a rear sensor), a lens, an image signal processor (ISP), or a flash (e.g., a light emitting diode (LED) or a xenon lamp).

The power management module 1195 may manage power of the electronic device 1101. According to an embodiment of the present disclosure, the power management module 1195 may include a power management integrated circuit (PMIC), a charger IC, a battery, or a battery gauge. The PMIC may employ a wired and/or a wireless charging method. A wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1196 and a voltage, current, or temperature thereof while the battery is charged.

The battery 1196 may include, for example, a rechargeable battery and/or a solar battery.

The indicator 1197 may display a certain state of the electronic device 1101 or a part thereof (e.g., the processor 1110), such as a booting state, a message state, a charging state, or the like. The motor 1198 may convert an electrical signal into a mechanical vibration, and may generate a vibration or a haptic effect. A processing device (e.g., a GPU) for supporting mobile TV may be included in the electronic device 1101. The processing device for supporting mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

The term "module" used herein may represent, for example, a unit including one of hardware, software, firmware, or a combination thereof. The term "module" may be interchangeably used with the terms "unit," "logic," "logical block," "component," and "circuit." The term "module" may indicate a minimum unit of an integrated component or may be a part thereof. The term "module" may indicate a minimum unit for performing one or more functions or a part thereof. The term "module" may be implemented mechanically or electronically. For example, the term "module" may include at least one of an application-specific integrated circuit (ASIC), a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a non-transitory computer-readable recording medium in the form of a program module. In the case where the instructions are performed by a processor (e.g., the processor 110 of FIG. 1), the processor may perform functions corresponding to the instructions. The non-transitory computer-readable recording medium may be, for example, the memory 160 of FIG. 1.

A non-transitory computer-readable recording medium may include a hard disk, a floppy disk, a magnetic medium (e.g., a magnetic tape), an optical medium (e.g., a compact disc ROM (CD-ROM), a digital versatile disc (DVD)), a magneto-optical medium (e.g., a floptical disk), or a hardware device (e.g., a ROM, a RAM, a flash memory, or the like). The program instructions may include machine language code generated by compilers and high-level language code that may be executed by computers using interpreters. The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative, or heuristic way. Furthermore, some operations may be performed in another order or may be omitted, or other operations may be added.

According to an embodiment of the present disclosure, a UE may reduce its power consumption when performing a voice call over a packet-based network.

In addition, a UE may provide various effects determined directly or indirectly through an embodiment of the present disclosure.

While the present disclosure has been shown and described with reference to certain embodiments thereof, it will be understood by those skilled in the art that various changes in form and detail may be made therein without departing from the scope of the present disclosure. Therefore, the scope of the present disclosure is not intended to be limited to the embodiments, but is defined by the appended claims and equivalents thereof.

What is claimed is:

1. An electronic device for providing a packet-based voice call function, comprising:
   a transmit antenna;
   a receive antenna; and
   a communication circuit configured to:
   establish an uplink channel using the transmit antenna;
   establish a downlink channel using the receive antenna;
   perform a packet-based voice call using the uplink channel and the downlink channel,
   obtain information associated with the downlink channel;
   determine a download schedule based on the obtained information associated with the downlink channel;
   determine a time required from a transmission request to a base station to a grant time;
   transmit a voice packet over the uplink channel based on the download schedule and the time required from the transmission request to the base station to a grant time; and
   transmit a scheduling request to the base station such that an overlapping period between a download period predicted from the download schedule and an uplink period predicted from the transmission of the voice packet is maximized.

2. The electronic device of claim 1, wherein the packet-based voice call comprises voice over long term evolution (VoLTE) based on a packet switched (PS) network.

3. The electronic device of claim 1, wherein the communication circuit is further configured to determine the download schedule based on a discontinuous reception (DRX) period and an on-duration timer included in the information associated with the download channel.

4. The electronic device of claim 1, wherein the communication circuit is further configured to:
   maintain an active state in a transmit and receive operation period of voice data and a receive waiting period of the voice data; and
   enter a power saving mode in a period except for the transmit and receive operation period and the receive waiting period.

5. The electronic device of claim 4, wherein the communication circuit is further configured to stop providing power to at least one of the transmit antenna and the receive antenna in the power saving mode.

6. The electronic device of claim 4, further comprising:
a voice engine,
wherein the communication circuit is further configured to stop providing power to the voice engine in the power saving mode.

7. The electronic device of claim 1, further comprising:
a microphone; and
a voice engine connected to the microphone,
wherein the voice engine is configured to:
convert a voice input into the voice packet, if the voice input is obtained through the microphone; and
provide the converted voice packet to the communication circuit.

8. The electronic device of claim 7, wherein the communication circuit is further configured to transmit the voice packet over the uplink channel based on the download schedule and the time required from the transmission request to the base station to the grant time if the voice packet is received from the voice engine.

9. The electronic device of claim 8, further comprising:
a speaker; and
the voice engine connected with the speaker,
wherein the voice engine is configured to:
decode a voice packet, if the voice packet is received via the communication circuit; and
output the decoded voice packet via the speaker.

10. The electronic device of claim 1, wherein the communication circuit is further configured to determine the time required from the transmission request to the base station to the grant time further based on a network status.

11. A method of providing a packet-based voice call function in a user equipment (UE), comprising:
obtaining information associated with a downlink channel from a base station;
determining a download schedule based on the obtained information associated with the downlink channel;
determining a time required from a transmission request time to the base station to a grant time;
transmitting voice data over an uplink channel based on the download schedule and the time required from the transmission request time to the base station to the grant time; and
transmitting a scheduling request to the base station such that an overlapping period between a download period predicted from the download schedule and an uplink period predicted from the transmission of the voice packet is maximized.

12. The method of claim 11, wherein determining the download schedule comprises:

obtaining a discontinuous reception (DRX) period and an on-duration timer included in the information associated with the downlink channel; and
determining a download period such that a communication circuit maintains an active state for a download based on the DRX period and the on-duration timer.

13. The method of claim 12, wherein transmitting the voice data comprises:
transmitting a voice packet to the base station such that at least part of the determined download period overlaps an upload period predicted by transmitting the voice packet, if semi-persistent scheduling (SPS) is granted for a voice call.

14. The method of claim 11, further comprising:
maintaining an active state of a communication circuit of the UE in a transmit and receive operation period of the voice data and a receive waiting period of the voice data; and
entering the communication circuit into a power saving mode in a period except for the transmit and receive operation period and the receive waiting period.

15. The method of claim 11, further comprising:
bundling at least two transmit periods of the voice data, if semi-persistent scheduling (SPS) is not granted for a voice call.

16. The method of claim 15, wherein bundling the at least two transmit periods of the voice data is comprised of bundling the at least two transmit periods of the voice data adaptively based on a jitter of the voice call or delay information of a called party's UE.

17. A non-transitory computer-readable recording medium having instructions stored thereon, wherein the instructions, when executed by an electronic device, cause the electronic device to:
obtain information associated with a downlink channel from a base station;
determine a download schedule based on the obtained information associated with the downlink channel;
determine a time required from a transmission request time to the base station to a grant time;
transmit voice data over an uplink channel, based on the download schedule and the time required from the transmission request time to the base station to the grant time, and
transmit a scheduling request to the base station such that an overlapping period between a download period predicted from the download schedule and an uplink period predicted from the transmission of the voice packet is maximized.

* * * * *